Dec. 26, 1944.   J. G. INGRES   2,365,960
CLUTCH OR BRAKE OPERATING MECHANISM
Filed Jan. 14, 1941   2 Sheets-Sheet 1
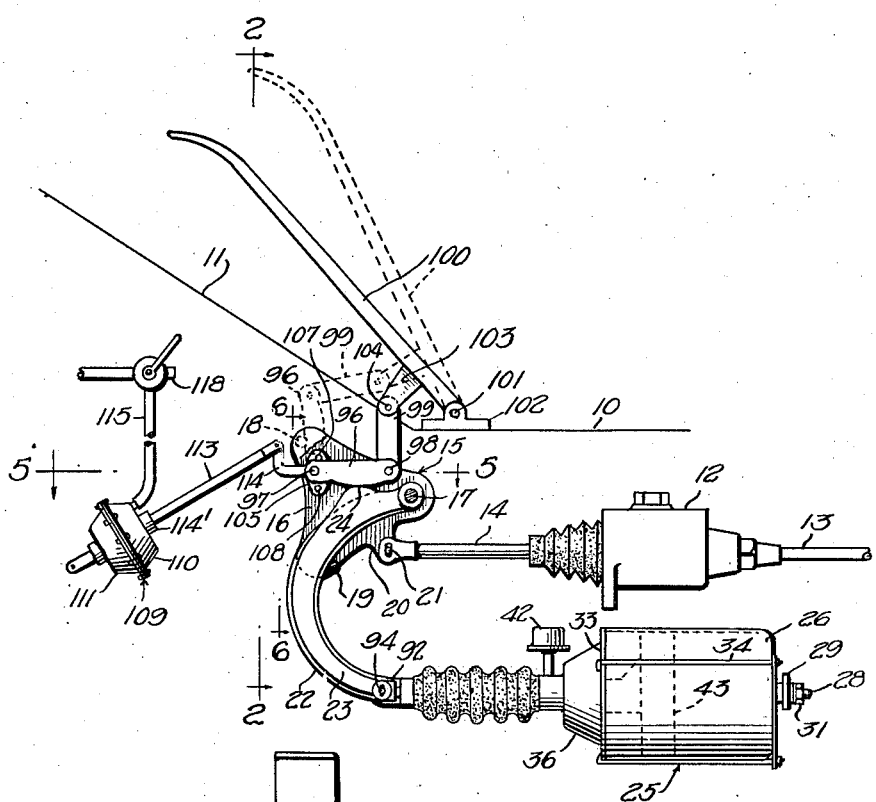
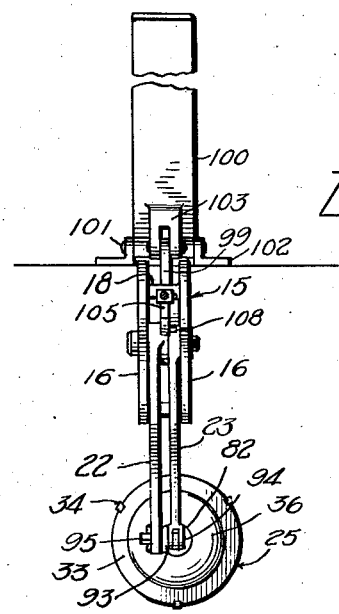
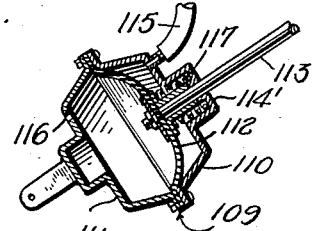
Inventor
J. G. INGRES

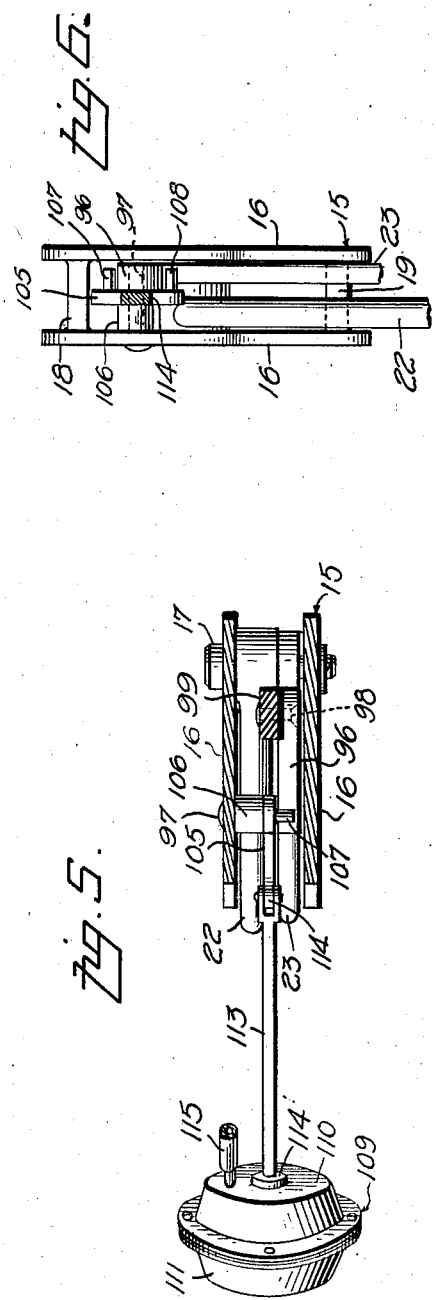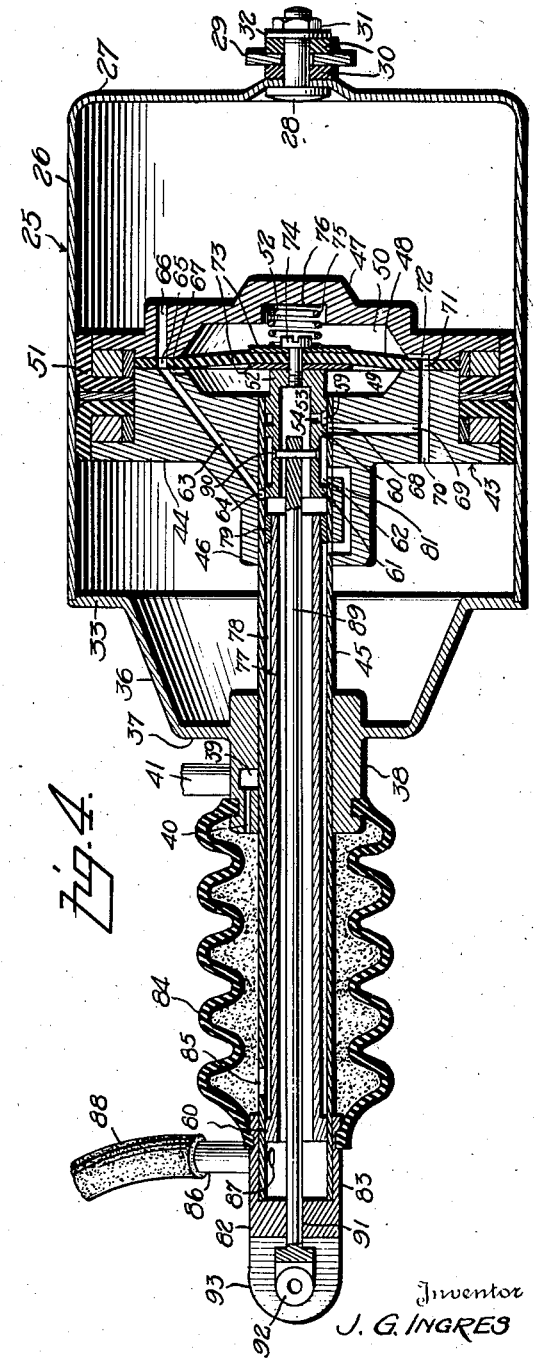

Patented Dec. 26, 1944

2,365,960

UNITED STATES PATENT OFFICE 2,365,960

CLUTCH OR BRAKE OPERATING MECHANISM

Jeannot G. Ingres, Detroit, Mich., assignor to Automatic Shifters, Inc., Richmond, Va., a corporation of Virginia Application January 14, 1941, Serial No. 374,364

38 Claims. (Cl. 188—152)

This invention relates to clutch or brake operating mechanisms, and particularly to a fluid pressure power operated brake mechanism for motor vehicles.

Numerous vacuum and other pressure fluid operated mechanisms have been devised for operating the clutches and brakes, and particularly the brakes, of motor vehicles wherein the pressure fluid motor is controlled by a hand or foot operated lever connected to a follow-up valve mechanism whereby the piston of the motor partakes of movement proportional to the movement of the control handle or pedal. These mechanisms are commonly operated by foot pedals and are so constructed as to provide for foot power operation of the brakes in the event the power of the operating motor fails for any reason. In view of the use of such construction it is necessary to provide a foot pedal for controlling the power brake wherein the pedal has as much travel as the conventional brake pedal so as to allow the construction to take advantage of the leverage necessary for foot operation of the brakes in the event of a failure in power of the operating motor.

There are now available automatic vacuum operated clutch control mechanisms which provide for accurate clutch control under all conditions of vehicle operation, thus permitting the conventional clutch pedal, if desired, to be completely eliminated. Such an arrangement permits the use of the brake pedal at the driver's left instead of at his right, thus eliminating the necessity of shifting the right foot back and forth between the accelerator pedal and the brake pedal.

An important object of the present invention is to provide a novel form of pressure fluid operated mechanism particularly adapted for operating the brakes of a motor vehicle and controlled from a foot operated element in the form of a treadle which normally has a relatively short travel similar to that of the accelerator pedal, thus permitting it to be very easily used by the foot of the operator without the necessity of having to move the foot through the substantial distance now necessary in operating brake pedals and without the necessity for having to lift the foot from the floor or toe board of the vehicle to place it on the brake pedal.

A further object is to provide a novel brake operating mechanism of the type referred to wherein the relatively short pedal or treadle travel takes place when the power mechanism is properly operating, and wherein the mechanical leverage is automatically changed and the distance of brake pedal travel is materially increased, upon the event of a failure in power in the fluid pressure motor, to permit the manual operation of the mechanism through the different leverage.

A further object is to provide such a mechanism wherein the relatively short pedal or treadle travel normally operates a follow-up valve mechanism to control the application of the brakes and wherein the treadle is provided with "feel" to permit more accurate operation of the brakes, and to combine with such mechanism novel means for increasing the mechanical leverage of the treadle and the throw of the treadle upon the event of a failure of power in the motor while at the same time rendering the motor wholly inoperative in the braking system so that foot operation of the brakes may take place without the necessity for the operator having to move the piston of the operating motor.

A further object is to provide an apparatus of this character wherein the same motive fluid which is depended upon for the operation of the actuating motor is employed for maintaining the normal operating connections between the treadle and the follow-up valve mechanism whereby, upon a failure of power in the actuating motor, the treadle will automatically move upwardly to provide a greater travel and will automatically provide for the proper mechanical connections and leverage between the pedal and the brake mechanism to permit the operator to manually apply the brakes in accordance with conventional practice.

A further object is to provide an apparatus of the character referred to wherein the "feel" means referred to functions to stabilize the operation of the follow-up valve mechanism to prevent the creeping of the brakes or the mechanism connected thereto whereby the placing of the control treadle in a given braking position will indefinitely maintain a given braking force on the brake drums.

Other objects and advantages of the invention will become apparent during the course of the following description.

In the drawings I have shown one embodiment of the invention. In this showing—

Figure 1 is a side elevation of the apparatus shown applied to a hydraulic brake master cylinder, Figure 2 is a section on line 2—2 of Figure 1, Figure 3 is a detail sectional view taken axially through the auxiliary motor which determines the power or manual operation of the brake system, Figure 4 is a central longitudinal sectional view through the fluid pressure motor, and associated elements, parts being shown in elevation and parts being broken away, Figure 5 is a section on line 5—5 of Figure 1, parts being shown in elevation, and, Figure 6 is a section of line 6—6 of Figure 1.

Referring to Figure 1 the numeral 10 designates a floor board of the driver's compartment of a motor vehicle and 11 indicates the toe board extending upwardly from the floor board. Beneath the floor board there is illustrated the usual master cylinder 12 of a conventional hydraulic brake system having piping generally indicated by the numeral 13 connected to the wheel brakes. Pressure is generated in the master cylinder 12 by exerting a rearward axial force on the usual plunger rod 14. The elements described form no part of the present invention per se and need not be further referred to in detail.

Referring to Figures 1, 2, 5 and 6 the numeral 15 designates as a whole a lever formed of a pair of spaced triangular plates 16 supported and mounted to turn on a transverse shaft 17, and this shaft is suitably supported by any stationary part of the vehicle as will become apparent. The shaft 17 is located adjacent one corner of the triangular plate structure and adjacent its other two corners the plates 16 are rigidly connected by cross members 18 and 19 which may be in the form of bars welded to the plate 16, or may be in the form of rivets as will become apparent. Each plate is provided intermediate the ends of its downwardly and rearwardly facing edge with an ear 20 connected by a pin 21 extending through the forward end of the brake plunger 14. The end of the plunger 14 may be slotted to allow for the turning movement of the lever 15 as will be obvious.

The shaft 17 also pivotally supports a pair of levers 22 and 23, the former of which is a power lever, as will be explained, and the latter of which is a valve operating lever. The power lever 22 is normally in engagement with the cross bar 19 as shown in Figure 1 and when power is applied to the lower end of the lever 22 to swing it rearwardly, it will engage the cross member 19 to swing the lever 15 and thus actuate the plunger rod 14. The valve operating lever 23 has its upper portion extended as at 24 to form a contact edge through which the lever is operated in a manner to be described.

The motor for the apparatus is indicated as a whole by the numeral 25. This motor comprises a cylinder 26, preferably in the form of pressed steel having a closed integral head 27 at one end through which passes a stud 28 (Figure 4). This stud passes through a supporting bracket 29 connected to any stationary portion of the vehicle and provided on opposite sides thereof with resilient pads 30 whereby the motor is adapted to swing to the extent necessary to accommodate itself to movement of the levers 22 and 23 as will become apparent. A nut 31 is threaded on the stud 28 and is provided with a washer 32 engaging the adjacent pad 30 whereby the two pads may be compressed to any desired extent.

The other end of the motor is provided with a head 33 secured in position in any suitable manner as by means of hook bolts 34 (Figure 1). The head 33 is provided with a frustro-conical portion 36 having its forward end extending inwardly as at 37 and carrying a bearing 38. This bearing is provided in one side with a recess 39 and the end of the bearing is provided with a passage 40 communicating with the recess 39 (Figure 4). A nipple 41 communicates with the recess 39 and admits air thereinto for a purpose to be described, and it will be obvious that a small air cleaner may be connected to the nipple 41, if desired, as indicated by the numeral 42 in Figure 1.

A piston indicated as a whole by the numeral 43 is reciprocable in the cylinder 26. This piston comprises a preferably die cast body 44 in which is arranged the inner end of a tubular plunger rod 45. The axial portion of the piston body is provided with a cylindrical extension 46 as shown in Figure 4. The piston is provided with a cap 47 secured thereto in any suitable manner and serving to clamp between itself and the body of the piston a flexible diaphragm 48. The piston body 44 and cap 47 are respectively recessed as at 49 and 50 to provide pressure chambers on opposite sides of the central portion of the diaphragm 48. The piston is provided with any suitable form of packing 51.

A valve indicated as a whole by the numeral 52 is mounted to reciprocate in the rear or left hand end of the tubular piston rod 45. This valve is provided with an axial recess 53 having a radial port 54 communicating with an annular groove 59 formed in the outer surface of the valve. Adjacent the groove 59 the valve is provided with a land 60 and a similar land 61 is formed adjacent the left hand end of the valve (Figure 4) to form therebetween an annular space 62.

The piston body 44 is provided with a passage 63 communicating at its forward end with a port 64 formed in the tubular plunger rod 45. The passage 63 communicates with the right hand end of the cylinder 26, as viewed in Figure 4, through a port 65 in the diaphragm 48 and through a passage 66 formed in the cap 47. The piston body 44 is grooved as at 67 to connect the chamber 49 to the passage 63 and accordingly any pressure present in the right hand end of the cylinder 26 will be duplicated in the chamber 49.

The tubular plunger rod 45 is further provided with a port 68 communicating through a radial passage 69 with a longitudinal passage 70 opening into the left hand end of the cylinder 26 as viewed in Figure 4. The passage 70 communicates through a port 71 in the diaphragm 48 and through a groove 72 in the cap 47 with the chamber 50. Accordingly pressures present in the left hand end of the cylinder 26 (Figure 4) are duplicated in the chamber 50.

The diaphragm 48 is provided with central washers 73 and these washers and the central portion of the diaphragm are secured to the adjacent end of the valve 52 by a screw 74. One of the washers engages the end of the valve and the other washer is engaged by a very light compression spring 75 extending into a recess 76 in the cap 47. The purpose of the spring 75 is to maintain the valve in a position releasing the brakes when the brake mechanism is intended to be out of operation, as will become apparent.

A tube 77 is arranged in the tubular plunger rod 45 and is spaced therefrom to provide an annular air passage 78. The end of this passage is closed by a bushing 79 tightly fitting between the tube 77 and plunger rod 45. The forward end of the passage 78 is closed in a similar manner or by a flange 80 carried by the tube 77. The piston body 44 and the plunger rod 45 are provided with a passage 81 affording constant communication between the air passage 78 and the valve groove 62. It will become apparent that atmospheric pressure, therefore, is always present in the groove 62.

A head 82 is arranged at the forward end of the plunger rod 45 and is provided with a rearwardly extending cylindrical portion 83 receiving the forward end of the plunger rod. A rubber or similar longitudinally deformable boot 84 is connected at opposite ends to the bearing 38 and cylindrical extension 83 to protect the tubular plunger rod from dust and other foreign material. The air passage 40 communicates with the interior of the boot 84 as shown in Figure 4 and the interior of the boot communicates with the air passage 78 through a port 85 in the plunger rod 45.

A nipple 86 is carried by the head 83 and communicates with the interior thereof through a port 87. A flexible hose 88 connects the nipple 86 to the intake manifold of the motor vehicle engine or to any other suitable source of partial vacuum. It will be apparent that the vacuum port 87 communicates with the interior of the tube 77, thus constantly connecting the axial recess 53 of the valve and the space just forwardly of the valve 52 with the source of partial vacuum. It will be noted that the valve 52 is shown in Figure 4 in its normal or neutral position with respect to the ports 64 and 68 and in such position of the valve both ends of the cylinder have slight communication with the source of vacuum to vacuum suspend the piston 43.

A valve operating rod 89 is arranged within the tube 77 and has its rear end extending into the axial passage 53 of the valve and pinned to the valve as at 90. The forward end of the valve operating rod extends through an opening 91 in the head 82 and is provided on its outer end with a yoke 92. Adjacent this yoke the head 82 is provided with an ear 93. Referring to Figures 1 and 2 it will be noted that the yoke 92 is connected to the lower end of the valve operating rod 23 by a pivot pin 94 so that movement of the lever 93 transmits movement to the valve 52. Referring to Figure 2 it will be noted that the ear 93 on the head 82 is connected by a relatively heavy pin 95 to the lower end of the power lever 22.

From the foregoing it will be apparent that movement of the lever 23 will move the valve 52 to effect operation of the piston 43 whereupon movement of this piston will operate the power lever 22 and at the same time cause the ports 64 and 68 to follow-up with respect to the valve 52. Thus the valve 52 and the rear end of the tubular plunger rod 45 with its ports 64 and 68 constitute a follow-up valve mechanism for the motor 25 whereby movement of the piston 43 takes place to an extent equal to movement of the valve 52.

Between the plates 16 of the lever 15 is arranged a link 96 in the plane of the valve lever 23 to engage the contact edge 24 thereof. The lever 96 is mounted on a pivot pin 97 extending between and fixed to the plates 16. The other end of the link 96 is pivotally connected as at 98 to the lower end of a link 99 extending upwardly through the floor board 10. Above the floor board a treadle 100 is arranged and has its lower end pivoted as at 101 to a suitable support 102. On its under side and adjacent its pivoted end the treadle 100 carries a lug 103 pivoted as at 104 to the upper end of the link 99. It will become apparent that the treadle 100 normally occupies the solid line position shown in Figure 1 and accordingly depression of the pedal moves the link 99 downwardly to turn the lever 96 in a clockwise direction about its pivot 97 to engage the contact edge 24 and thus turn the lever 23 in a counterclockwise direction about its pivot 17.

Means are provided for automatically changing the position of the treadle 100 and providing for normal leverage connections between the treadle and the hydraulic brake plunger rod 14 upon a failure of power in the motor 25. Referring to Figures 1, 2, 5 and 6, the numeral 105 designates a plate mounted on the pin 97 and provided with a spacing bushing 106 surrounding such pin so as to maintain the lever 105 adjacent the link 96. The plate 105 is shown in its normal position in Figures 1 and 6 and the plate is provided with pins 107 and 108 the former of which, when the plate is in normal position, just clears the adjacent edge of the link 96 and the latter of which is spaced slightly below the lower edge of the link 96.

As is true of the link 96, the plate 105 turns on the pin 97 as an axis and means are provided for swinging the plate 105 to turn the link 96 to the power operating position shown in solid lines in Figure 1 or to the foot operating position shown in dotted lines in Figure 1. A small vacuum motor indicated as a whole by the numeral 109 is formed of a pair of stamped casing sections 110 and 111 between which is clamped a flexible diaphragm 112. A rod 113 is fixed to the diaphragm 112 and extends through bearing 114' formed in the casing section 110. The end of the rod 113 is pivotally connected to an arm 114 formed integral with the lever 105 and having its free end turned upwardly as shown in Figure 1. The casing section 110 is provided with a hose 115 to connect the interior thereof to the same source of vacuum as is used for operating the motor 25. The casing section 111 is vented to the atmosphere as at 116 and a spring 117 is arranged in the casing section 110 and urges the diaphragm 112 downwardly and to the left as viewed in Figures 1 and 3 to tend to turn the lever 105 in a counterclockwise direction under which conditions the link 96 will be arranged in the dotted line position shown in Figure 1.

While the invention obviously is particularly intended for the power operation of clutches or brakes, the vacuum line 115 connecting the auxiliary motor 109 to the intake manifold may be provided with a three-way valve 118 operable manually for disconnecting the pipe 115 from the intake manifold and connecting it to the atmosphere. The valve 118 is generally indicated in Figure 1 and it will be obvious that it will be located at a point accessible to the operator so that he may, at will, condition the apparatus for foot operation by rendering the auxiliary motor 109 inoperative.

The operation of the apparatus is as follows:
During operation of the vehicle engine, a partial vacuum will always be present in the auxiliary motor casing 110, whereby atmospheric pressure in the casing 111 will maintain the diaphragm 112 in the position shown in Figure 3, holding the spring 117 under compression. Under such conditions the plate 105 will be held by the arm 114 in the position shown in Figure 1, thus maintaining the links 96 and 99 and treadle 100 in the solid line position in Figure 1. The diaphragm 112 will be at its upper limit of movement and thus the auxiliary motor will not tend to turn the plate 105 beyond the position shown in Figure 1 and hence the upper pin 107 will not exert any downward force on the link 96 to tend to turn the valve lever 23.

When the brake is to be applied the operator will depress the treadle 100 in much the same manner as he depresses the accelerator pedal, the heel of the foot resting on the floor. In other words, it is unnecessary for the operator to lift his foot and place it on top of the treadle at the upper end thereof as is required in the operation of a conventional brake pedal. The power operation of the brake in the manner to be described permits the treadle 100 to be operated with approximately as little effort as is required for the operation of the accelerator pedal. The effort required will depend, of course, on the design of the apparatus and particularly the area of the diaphragm 48 (Figure 4) as will become apparent.

With the links 96 and 99 and the treadle 100 in the solid line position shown in Figure 1, the operator will depress the treadle in the manner stated and the bracket 103 will move the link 99 downwardly to swing the link 96 about its pivot 97. The lower edge of the link 96 and the contact edge 24 of the valve operating lever 23 are not perfectly flat but are slightly curved so as to maintain the point of contact approximately midway between the axis of the pin 97 and the axis of the shaft 17 so as to maintain an approximately uniform leverage for operating the valve mechanism of the motor 25 throughout the range of movement of the valve mechanism.

Depression of the pedal causes the link 96 to swing the lever 23 in a counterclockwise direction on the shaft 17, and accordingly the pin 94 will move the valve operating rod 89 to the right as viewed in Figure 4. This action causes the valve land 61 to open the port 64 to a greater extent while the land 60 will move to the right across the port 68 to close communication between this port and the vacuum space 59 while opening the port 68 gradually to the atmospheric space 62. Under such conditions the right hand end of the cylinder 26 as viewed in Figure 4 will be connected to the source of vacuum through passages 66, 65 and 63, port 64 and thence through the interior of the tube 77 and through the port 87 and hose 88 to the intake manifold. At the same time air will be admitted into the left hand end of the cylinder 26, as viewed in Figure 4, through passages 70 and 69, port 68, atmospheric space 62, passage 81 and air passage 78, and thence through port 85, the interior of the boot 84, passage 40, recess 39 and nipple 41.

Under such circumstances the piston 43 will move toward the right and the extent of movement will depend upon the extent of movement of the valve 52. For example, assuming that the operator desires to only partially apply the brakes, he will move the valve 52 to cause the piston 43 to partake of corresponding movement, and when movement of the valve 52 is stopped the valve lands 60 and 61 will immediately assume their neutral positions shown in Figure 4 to cut off the admission of air into the left hand end of the cylinder and exhaust the air through the port 68 and vacuum groove 59. The piston thereupon will be vacuum suspended and will remain stationary pending further operation of the valve 52 by the treadle.

As the piston 43 moves to the right as viewed in Figures 1 and 4, the head 93 will move the lower end of the power lever 22 toward the right (Figure 1) and the inner edge of the power lever will engage the cross bar 19 to swing the lever 15 in a counterclockwise direction thus exerting a force on the rod 14 to move it toward the right and thus displace brake fluid from the master cylinder 12 to apply the brakes, the displacement of the brake fluid and the consequent braking action depending upon the extent of movement of the piston 43.

When the brakes are to be released, the operator will raise his foot to release the treadle 100. This movement releases the pressure of the link 96 on the valve operating lever 23, whereupon this lever and the valve 52 will move toward the left (Figure 4). This operation connects the air groove 62 to the port 64 to admit air into the right hand end of the cylinder 26, and at the same time connects the vacuum groove 59 to the port 68 to exhaust air from the left hand end of the cylinder 26, whereupon the piston 43 will move toward the left as will be obvious.

The usual biasing means tending to return the vehicle brakes to inoperative or released position will react through the rod 14 (Figure 1) to swing the triangular lever 15 back to its normal position. The movement of the lever 23 back to its normal position upon the releasing of the treadle may be accomplished by any desired biasing spring and in the present instance it will be obvious that this result will be accomplished by the spring 75 (Figure 4). In this connection attention is invited to the fact that if the spring 75 is depended upon to move the valve 52 toward the left, when the treadle is released and to return the valve operating lever to its normal position, the spring 75 will be such as to exert very slightly greater than the necessary force for accomplishing these movements. This slight additional spring force is desirable for the purpose of positively maintaining the valve 52 slightly to the left of its neutral position to insure the maintenance of the piston 43 in a position adjacent the left hand end of the cylinder 26 (Figure 4) to positively prevent the accidental application of any braking force.

In this connection it has been stated for the purpose of description that the valve 53 maintains a neutral position when the piston 43 is stationary. This neutral position, however, is not an exact position in which both ports 64 and 68 are equally slightly open to the source of vacuum since such a position of the valve would balance pressures at opposite ends of the cylinder 26 and the biasing means tending to return the brakes to released position would turn the power lever 22 in a clockwise direction. Therefore it will be understood that when movement of the valve 52 is stopped in any position except the released position a slight movement of the piston 43 will occur through operation of the brake biasing means until sufficient atmospheric leakage occurs between the space 62 (Figure 4) and the port 68 to build up pressure in the left hand end of the cylinder 26 to the extent necessary to hold the piston 43 against further movement. In the fully released position of the brakes with the treadle 100 in the normal position shown in solid lines in Figure 1, the spring 75 will urge the valve 52 slightly to the left of the true neutral position as viewed in Figure 4 to cut off communication between the port 64 and the source of vacuum and to definitely connect the vacuum space 59 with the port 68. The spring 75, in addition to returning the valve 52 and the lever 23 to their normal inoperative positions, serves to maintain slightly unbalanced pressure in the ends of the cylinder 26 to positively hold the piston 43 in the brake releasing position.

It will be obvious that any pressure in the right hand end of the cylinder 26 as viewed in Figure 4 will be duplicated in the chamber 49 through the groove 67, and that any pressure in the left hand end of the cylinder 26 will be duplicated in the chamber 50 through passage 70 and groove 72. Thus when the operator is moving the treadle 100 or is holding the treadle in any position except the released position, differential pressures on opposite sides of the diaphragm 48 will exert a reaction force through the rod 91, valve operating lever 23, links 96 and 99 and treadle 100 to provide the mechanism with "feel." It will be obvious that the portion of the diaphragm 48 which is affected by differential pressures bears a fixed relationship to the total area of the piston 43 and accordingly resistance to movement of the treadle 100 is always proportional to differential pressures in the ends of the cylinder 26. Moreover, the braking action effecting displacement of the fluid from the master cylinder 12 will be directly proportional to differential pressures in the ends of the cylinder 26. It necessarily follows that the operator will always feel in the treadle 100 a resistance which is directly proportional to the braking action. The force of the spring 75 is so slight in proportion to the braking force applied and to the fluid pressure reaction transmitted to the treadle 100 that it does not noticeably affect the accuracy of the "feel" and without using substantial force the operator is enabled to accurately "feel" the application of the brakes.

As previously indicated, it is desirable to maintain the treadle 100 in operation strictly as a treadle to permit the operator to transmit movement thereto while maintaining his foot in a relatively low position with respect to the floor board 10, as is true in the operation of the accelerator. At the same time, it is highly desirable to provide for the manual operation of the brakes in the event of a failure of power in the motor. However, it ordinarily would not be possible to provide the substantial leverage necessary for manual operation of the brakes within the limited normal range of movement of the treadle 100 between the solid line position shown in Figure 1 and the toe board 11. The present construction provides means for automatically establishing approximately the normal mechanical leverage between the treadle 100 and the master cylinder plunger rod 14, and for automatically placing the treadle 100 in a higher position where the mechanical leverage can be taken advantage of for the full application of the brakes.

Assuming that there is no partial vacuum available for operating the motor 25, it necessarily follows that no partial vacuum will be available for the auxiliary motor 109. Under such circumstances, the spring 117 will move the diaphragm 112 (Figure 3) downwardly and to the left to transmit similar force to the rod 113. This force will be transmitted to the arm 114 (Figure 1) to swing the plate 105 in a counterclockwise direction about the pivot 97. Under such circumstances, the pin 108, which is normally arranged sufficiently below the lower edge of the link 96 to permit full manual operation of this link to transmit movement to the valve operating lever 23, will swing in a counterclockwise direction to engage the link 96 and move it to the position shown in dotted lines in Figure 1. This movement of the link 96 pushes upwardly and rearwardly on the pivot 104, through the link 99, to move the treadle 100 to the dotted line position shown in Figure 1. Under such circumstances the treadle 100 obviously has a substantially greater range of movement downwardly toward the toe board 11 to take advantage of the leverage arrangement provided through the operation referred to.

When the links 96 and 99 and treadle 100 are in the dotted line positions shown in Figure 1, the link 96 will bear against the cross bar 18. The operator then may move his foot to a higher position on the treadle 100 to take greater advantage of the longer lever arm thus provided, and upon depression of the treadle, the links 99 and 96 will be actuated and the latter will engage the cross bar 18 to positively turn the triangular lever 15 in a counterclockwise direction. This operation moves the plunger rod 14 toward the right in Figure 1 to displace fluid from the master cylinder 12 and thus manually apply the brakes.

It will be apparent therefore that the present mechanism provides for a treadle operation of the brakes through the power provided by the motor 25 and the operator may move the treadle 100 under such conditions as easily as he operates the accelerator pedal without the necessity for having to raise his foot as is true in a conventional brake pedal, and without having to use substantial force. However, upon a failure in power from any cause, the deenergization of the auxiliary motor 109 immediately moves the links 96 and 99 to a position wherein a positive mechanical connection is provided between the treadle 100 and the master cylinder plunger rod 14 while at the same time providing the necessary substantial leverage ratio for the manual operation of the brakes. It also will be apparent that when manual operation of the brakes takes place the operator is not called upon to exert the substantial force which would be necessary for moving the piston 43 in the cylinder 26. The piston of the motor remains stationary and this is likewise true of the power lever 22 and valve operating lever 23, the cross bar 19 moving away from the two levers referred to when the brakes are manually operated.

It will be apparent that the device thus constitutes an efficient and effective power operating means for a motor vehicle brake or clutch wherein accurate "feel" is provided in the treadle. It also will be apparent that the device is quickly automatically converted into a manually operable brake or clutch actuating mechanism upon a failure of power in the motor. Likewise, the provision of the three-way valve 118 permits the operator, if he so desires, to connect the motor casing 110 (Figures 1 and 2) to the atmosphere, thus converting the apparatus to a manually operable mechanism at the will of the operator.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. An operating mechanism for a motor vehicle clutch or brake having an operating element, comprising a power device, a control mechanism for said power device, a manually operable member connected to said control mechanism and normally mechanically disconnected from said operating element and having a given normal position, and means automatically operative upon a failure of power in said power device for mechanically connecting said manually operable member to said operating element, for the direct manual operation thereof and being constructed and arranged to change the normal position of said manually operable member.

2. An operating mechanism for a motor vehicle clutch or brake having an operating element, comprising a power device, a control mechanism for said power device, a manually operable member connected to said control mechanism and normally mechanically disconnected from said operating element, said manually operable member having a normal position from which it is movable through a relatively limited range of movement to operate said control mechanism, and means automatically operative upon a failure of power in said power device for mechanically connecting said manually operable member to said operating element and for changing the normal position of said manually operable member to a second normal position from which it will have a greater range of movement.

3. An operating mechanism for the clutch or brake of a motor vehicle wherein the clutch or brake is provided with an operating element and wherein the motor vehicle is provided with a floor board, comprising a power device for actuating said operating element, a control device for said power device, a treadle having a given normal position above the vehicle floor board and connected to said control device, and means for mechanically connecting said treadle to said operating element for the direct operation thereof wholly independently of said power device and being constructed and arranged to change the nomal position of said treadle.

4. An operating mechanism for the clutch or brake of a motor vehicle wherein the clutch or brake is provided with an operating element and wherein the motor vehicle is provided with a floor board, comprising a power device for actuating said operating element, a control device for said power device, a treadle projecting above the vehicle floor board and connected to said control device, said treadle having a normal position from which it has a relatively limited range of movement toward the floor board for operating said control device, and means automatically operative upon a failure of power in said power device for mechanically connecting said treadle to said operating element for the direct operation thereof, said means being constructed and arranged to change the normal position of said treadle to a second normal position higher above the vehicle floor board to increase the range of movement of said treadle.

5. An operating mechanism for a vehicle clutch or brake having an operating element, comprising a differential fluid pressure operated motor for actuating said operating element, a manually operable control member having a given normal position, a follow-up control valve mechanism having connection with said control member and with said motor whereby the latter moves said operating element in accordance with movement of said control member, and means for mechanically connecting said control member to said operating element wholly independently of said motor for direct manual operation of said operating element and being constructed and arranged to change the normal position of said control member.

6. An operating mechanism for a motor vehicle clutch or brake having an operating element, comprising a differential fluid pressure motor for actuating said operating element, a manually operable control member normally mechanically disconnected from said operating element and having a normal position from which it is movable in a limited range of movement, a follow-up control valve mechanism having connection with said motor and with said manually operable member whereby said motor moves said operating element in accordance with movement of said manually operable member, and means automatically operative upon a failure of power in said motor for mechanically connecting said manually operable member to said operating element, said means being constructed and arranged to automatically move said manually operable member to a second normal position from which it has a greater range of movement.

7. An operating mechanism for the clutch or brake of a motor vehicle wherein the clutch or brake has an operating element and wherein the vehcile is provided with a floor board, comprising a differential fluid pressure operated motor for actuating said operating element, a treadle mounted above the vehicle floor board and having a given normal position, said treadle being normally mechanically disconnected from said operating element, a follow-up control valve mechanism having connection with said motor and with said treadle whereby said motor moves said operating element proportional to the movement of said treadle, and means for mechanically connecting said treadle to said operating element for direct operation thereof and being constructed and arranged to change the normal position of said treadle.

8. An operating mechanism for the clutch or brake of a motor vehicle wherein the clutch or brake has an operating element and wherein the vehicle is provided with a floor board, comprising a differential fluid pressure operated motor for actuating said operating element, a treadle mounted above the vehicle floor board and normally occupying a position from which it has limited downward movement toward the floor board, said treadle being normally mechanically disconnected from said operating element, a follow-up control valve mechanism having connection with said motor and with said treadle whereby said motor moves said operating element proportional to the movement of said treadle, and means automatically operative upon a failure of power in said motor for mechanically connecting said treadle to said operating element for direct operation thereof, said means being constructed and arranged to move said treadle to a second normal position from which it has a greater range of movement toward the vehicle floor board for the direct operation of said operating element.

9. An operating mechanism for a motor vehicle clutch or brake having an operating element, comprising a power device for transmitting movement to said operating element, a control mechanism for said power device, a manually operable control member, mechanical means connected to said manually operable member for transmitting movement from the latter to said control mechanism to energize said power device, or to said operating element for the manual operation thereof, and an auxiliary power device connected to said mechanical means, said auxiliary power device having a movable member biased to a position for rendering said mechanical means operative for transmitting movement from said manually operable member to said operating element, said auxiliary power device being connectible to the same source of power as said first named power device to render said mechanical means operative for connecting said manually operable member to said control device.

10. An operating mechanism for a motor vehicle clutch or brake having an operating element, comprising a power device for transmitting movement to said operating element, a control mechanism for said power device, a manually operable control member normally occupying a position from which it has a relatively limited range of movement, mechanical means connected to said manually operable member for transmitting movement from the latter to said control mechanism to energize said power device, or to said operating element for the manual operation thereof, and an auxiliary power device connected to said mechanical means, said auxiliary power device having a movable member biased to a position for rendering said mechanical means operative for transmitting movement from said manually operable member to said operating element, said auxiliary power device being connectible to the same source of power as said first named power device to render said mechanical means operative for connecting said manually operable member to said control device, said mechanical means being constructed and arranged to change the normal position of said manually operable member to increase the range of movement thereof when said biasing means acts on said mechanical means to connect said manually operable member to said operating element.

11. An operating mechanism for the clutch or brake of a motor vehicle wherein the motor vehicle is provided with a floor board and wherein the clutch or brake is provided with an operating element, comprising a differential fluid pressure operated motor for actuating said operating element, a treadle arranged above the floor board and normally mechanically disconnected from said operating element, a follow-up control valve mechanism for said motor, mechanical means constructed and arranged for connecting said treadle to said follow-up valve mechanism or to said operating element, and an auxiliary fluid pressure operated motor connected to said mechanical means, said auxiliary motor having biasing means for rendering said mechanical means effective for transmitting movement from said treadle to said operating element, and said auxiliary motor being connectible to the same source as said first named motor for overcoming said biasing means to render said mechanical means effective for transmitting movement from said treadle to said valve mechanism.

12. An operating mechanism for the clutch or brake of a motor vehicle wherein the motor vehicle is provided with a floor board and wherein the clutch or brake is provided with an operating element, comprising a differential fluid pressure operated motor for actuating said operating element, a treadle arranged above the floor board and normally mechanically disconnected from said operating element, said treadle occupying a normal position from which it has relatively limited movement downwardly toward the floor board, a follow-up control valve mechanism for said motor, mechanical means constructed and arranged for connecting said treadle to said follow-up valve mechanism or to said operating element, and an auxiliary fluid pressure operated motor connected to said mechanical means, said auxiliary motor having biasing means for rendering said mechanical means effective for transmitting movement from said treadle to said operating element, and said auxiliary motor being connectible to the same source as said first named motor for overcoming said biasing means to render said mechanical means effective for transmitting movement from said treadle to said valve mechanism, said mechanical means being constructed and arranged to move said treadle to a position higher above the vehicle floor board to increase the range of movement of said treadle when said biasing means is operative.

13. An operating mechanism for a clutch or brake having an operating element, comprising a power device, a control device therefor, a power lever connected to said power device, a control lever connected to said control device, a manually operable member normally mechanically connected to said control lever, connecting means for transmitting movement from said power lever to said operating element, and means for mechanically connecting said manually operable member to said connecting means for the manual operation of said operating element, said connecting means being movable independently of said power lever when mechanically connected to said manually operable member.

14. An operating mechanism for a motor vehicle clutch or brake having an operating element, comprising a power device, a control device therefor, a power lever connected to said power device, a control lever connected to said control device, connecting means for transmitting movement from said power lever to said operating element, a manually operable member connected to said control lever and normally occupying an inoperative position from which it has relatively limited movement for operating said control lever, and means automatically operative upon a failure of power in said power device for connecting said manually operable member to said connecting means for the manual operation of said operating element, said last named means being constructed and arranged for operation upon a failure of power in said power device to move said manually operable member to a second inoperative position from which it has a greater range of movement for the manual operation of said operating element.

15. An operating mechanism for a motor vehicle clutch or brake having an operating element, comprising a differential fluid pressure operated motor, a follow-up control valve mechanism therefor, a power lever connected to said motor, a control lever connected to said valve mechanism, connecting means for transmitting movement from said power lever to said operating element, a manually operable member normally connected with said control lever to operate said valve mechanism, and means for disconnecting said manually operable member from said control lever and mechanically connecting it to said connecting means for the manual operation of said operating element.

16. An operating mechanism for a vehicle clutch or brake having an operating element, comprising a differential fluid pressure operated motor, a follow-up control valve mechanism therefor, a power lever connected to said motor, a control lever connected to said valve mechanism, connecting means for transmitting movement from said power lever to said operating element, a manually operable member normally disconnected from said connecting means and normally having mechanical connection with said control lever to operate said valve mechanism, said member being normally arranged in an inoperative position from which it has a relatively limited range of movement for operating said control lever, and means for mechanically connecting said manually operable member to said connecting means for the manual operation of said operating element, said last named means being constructed and arranged, when operative, to move said manually operable member to a second inoperative position from which it has a relatively greater range of movement.

17. An operating mechanism for the clutch or brake of a motor vehicle wherein the vehicle is provided with a floor board and wherein the clutch or brake is provided with an operating element, comprising a power device, a control device therefor, a power lever connected to said power device, a control lever connected to said control device, connecting means for transmitting movement from said power lever to said operating element, a treadle arranged above the vehicle floor board and normally connected to said control lever to transmit movement thereto, and means automatically operative upon a failure of power in said power device for mechanically connecting said treadle to said connecting means independently of said power lever for the manual operation of said operating element.

18. An operating mechanism for the clutch or brake of a motor vehicle wherein the vehicle is provided with a floor board and wherein the clutch or brake is provided with an operating element, comprising a power device, a control device therefor, a power lever connected to said power device, a control lever connected to said control device, connecting means for transmitting movement from said power lever to said operating element, a treadle arranged above the vehicle floor board and normally occupying an inoperative position from which it has relatively limited movement downwardly toward the floor board, said treadle being normally mechanically disconnected from said connecting means and normally connected to said control lever to transmit movement thereto, and means automatically operative upon a failure of power in said power device for mechanically connecting said treadle to said connecting means for the manual operation of said operating element, said last named means being constructed and arranged to operate upon a failure of power in said power device to move said treadle to a second inoperative position from which it has a greater range of movement downwardly toward the vehicle floor board.

19. An operating mechanism for the clutch or brake of a motor vehicle wherein the motor vehicle is provided with a floor board and wherein the clutch or brake is provided with an operating element, comprising a differential fluid pressure operated motor, a follow-up control valve mechanism therefor, a power lever connected to said motor, a control lever connected to said valve mechanism, connecting means connected to said operating element and through which movement of said lever transmits movement to said operating element, a treadle arranged above the vehicle floor board, said treadle being normally mechanically connected to said control lever to transmit movement thereto, and means automatically operative upon a failure of power in said motor for mechanically connecting said treadle to said connecting means independently of said power lever for the manual operation of said operating element.

20. An operating mechanism for the clutch or brake of a motor vehicle wherein the motor vehicle is provided with a floor board and wherein the clutch or brake is provided with an operating element, comprising a differential fluid pressure operated motor, a follow-up control valve mechanism therefor, a power lever connected to said motor, a control lever connected to said valve mechanism, connecting means connected to said operating element and through which movement of said lever transmits movement to said operating element, a treadle arranged above the vehicle floor board and normally occupying an inoperative position from which it has relatively limited movement downwardly toward the floor board, said treadle being normally mechanically connected to said control lever to transmit movement thereto, and means automatically operative upon a failure of power in said motor for mechanically connecting said treadle to said connecting means for the manual operation of said operating element, said last named means being constructed and arranged to operate upon a failure of power in said motor to move said treadle to a second inoperative position from which it has a greater range of movement downwardly toward the vehicle floor board for the manual operation of said operating element.

21. An operating mechanism for a motor vehicle clutch or brake having an operating element, comprising a power device, a control device for said power device, a manually operable member normally connected to said control device and normally mechanically disconnected from said operating element, reaction means for transmitting to said manually operable member a force reaction proportional to the force generated in said power device, and means automatically operative upon a failure of power in said power device for mechanically connecting said manually operable member to said operating element, said last named means being constructed and arranged to be operative upon a failure of power in said power device for disconnecting said manually operable member from said control device.

22. An operating mechanism for a motor vehicle clutch or brake having an operating element, comprising a power device, a control device for said power device, a manually operable member normally connected to said control device and normally mechanically disconnected from said operating element, reaction means for transmitting to said manually operable member a force reaction proportional to the force generated in said power device, said manually operable member having a normal position from which it is movable through a relatively limited range of movement to operate said control device, and means automatically operative upon a failure of power in said power device for mechanically connecting said manually operable member to said operating element and for changing the normal position of said manually operable member to a second normal position from which it has a greater range of movement, said last named means being constructed and arranged to be operative upon a failure of power in said power device for mechanically disconnecting said manually operable means from said control mechanism and from said reaction means.

23. An operating mechanism for a vehicle clutch or brake having an operating element, comprising a differential fluid pressure operated motor for actuating said operating element, a manually operable control member normally mechanically disconnected from said operating element, a follow-up control valve mechanism normally having connection with said control member and with said motor whereby the latter moves said operating element in accordance with movement of said control member, reaction means for transmitting to said control member a force reaction proportional to the force generated in said motor, and means operative to mechanically connect said control member to said operating element, said means being constructed and arranged to mechanically disconnect said control member from said valve mechanism and from said reaction means.

24. An operating mechanism for a vehicle clutch or brake having an operating element, comprising a differential fluid pressure operated motor for actuating said operating element, a manually operable control member normally mechanically disconnected from said operating element, a follow-up control valve mechanism normally having connection with said control member and with said motor whereby the latter moves said operating element in accordance with movement of said control member, reaction means for transmitting to said control member a force reaction proportional to the force generated in said motor, said control member having a normal inoperative position from which it is movable through a limited range of movement to operate said valve mechanism, and means operative upon a failure of power in said motor to change the normal position of said control member to increase its range of movement and to mechanically connect it to said operating element for the manual operation thereof, said last named means being constructed and arranged to operate upon a failure of power in said motor to mechanically disconnect said control member from said valve mechanism and from said reaction means.

25. An operating mechanism for a clutch or brake having an operating element, comprising a power device, a control device therefor, a power lever connected to said motor, a control lever connected to said control device, connecting means for transmitting movement from said power lever to said operating element, a manually operable member normally mechanically connected to said control lever, reaction means for transmitting to said control lever and thence to said manually operable member a force reaction opposing movement of such member proportional to the power developed by said motor, and means for mechanically connecting said manually operable member to said connecting means for the manual operation of said operating element, and to mechanically disconnect said manually operable member from said control lever.

26. An operating mechanism for a clutch or brake having an operating element, comprising a power device, a control device therefor, a power lever connected to said motor, a control lever connected to said control device, connecting means for transmitting movement from said power lever to said operating element, a manually operable member normally mechanically connected to said control lever, reaction means for transmitting to said control lever and thence to said manually operable member a force reaction opposing movement of such member proportional to the power developed by said motor, said manually operable member normally occupying an inoperative position from which it is movable through a limited range of movement to operate said control lever, and means automatically operative upon a failure of power in said power device for mechanically connecting said manually operable member to said connecting means for the manual operation of said operating element, and to mechanically disconnect said manually operable member from said control lever, said last named means being constructed and arranged to operate upon a failure of power in said power device to move said manually operable member to a second normal position from which it has an increased range of movement for the manual operation of said operating element.

27. An operating mechanism for a motor vehicle clutch or brake having an operating element, comprising a differential fluid pressure operated motor, a follow-up control valve mechanism therefor, a control lever connected to said valve mechanism, a power lever connected to said motor, a transmission lever connected to said operating element and arranged to be operable by said power lever upon energization of said motor, said levers all being mounted for turning movement on a common axis, a manually operable member normally mechanically disconnected from said transmission lever and arranged to move said control lever to operate said valve mechanism, and means for disconnecting said manually operable member from said control lever and establishing a force transmitting connection between said manually operable member and said transmission lever for the manual operation of said operating element.

28. An operating mechanism for a motor vehicle clutch or brake having an operating element, comprising a differential fluid pressure operated motor, a follow-up control valve mechanism therefor, a control lever connected to said valve mechanism, a power lever connected to said motor, a transmission lever connected to said operating element and arranged to be operable by said power lever upon energization of said motor, said levers all being mounted for turning movement on a common axis, a manually operable member normally mechanically disconnected from said transmission lever and arranged to move said control lever to operate said valve mechanism, reaction means for transmitting to said control lever and thence to said manually operable member a force reaction opposing movement of such member to a degree proportional to the power generated in said motor, and means for disconnecting said manually operable member from said control lever and establishing a force transmitting connection between said manually operable member and said transmission lever for the manual operation of said operating element.

29. An operating mechanism for a motor vehicle clutch or brake having an operating element, comprising a differential fluid pressure operated motor, a follow-up control valve mechanism therefor, a control lever connected to said valve mechanism, a power lever connected to said motor, a transmission lever connected to said operating element and arranged to be operable by said power lever upon energization of said motor, said levers all being mounted for turning movement on a common axis, a manually operable member normally mechanically disconnected from said transmission lever and arranged to move said control lever to operate said valve mechanism, said manually operable member normally occupying an inoperative position from which it has a limited range of movement for operating said control lever, and means automatically operative upon a failure of power in said motor for disconnecting said manually operable member from said control lever and mechanically connecting it to said transmission lever for the manual operation of said operating element, and for changing the normal position of said manually operable member to a second inoperative position from which it has an increased range of movement.

30. An operating mechanism for a motor vehicle clutch or brake having an operating element, comprising a differential fluid pressure operated motor, a follow-up control valve mechanism therefor, a control lever connected to said valve mechanism, a power lever connected to said motor, a transmission lever connected to said operating element and arranged to be operable by said power lever upon energization of said motor, said levers all being mounted for turning movement on a common axis, a manually operable member normally mechanically disconnected from said transmission lever and arranged to move said control lever to operate said valve mechanism, said manually operable member normally occupying an inoperative position from which it has a limited range of movement for operating said control lever, reaction means for transmitting to said control lever and thence to said manually operable member a force reaction opposing movement of said manually operable member to a degree proportional to the power generated in said motor, and means automatically operative upon a failure of power in said motor for disconnecting said manually operable member from said control lever and mechanically connecting it to said transmission lever for the manual operation of said operating element, and for changing the normal position of said manually operable member to a second inoperative position from which it has an increased range of movement.

31. An operating mechanism for a vehicle clutch or brake having an operating element, comprising a double acting differential fluid pressure operated motor for actuating said operating element, a manually operable control member, a follow-up control valve mechanism having connection with said control member and with said motor whereby the latter moves said operating element in accordance with movement of said control member, spring means tending to bias said valve mechanism to a position wherein said motor is energized to be held in a brake- or clutch-releasing position, and means operative to mechanically connect said control member to said operating element wholly independently of said motor.

32. An operating mechanism for a motor vehicle clutch or brake having an operating element, comprising a double acting differential fluid pressure motor for actuating said operating element, a manually operable control member having a normal position from which it is movable in a limited range of movement, a follow-up control valve mechanism having connection with said motor and with said manually operable member whereby said motor moves said operating element in accordance with movement of said manually operable member, spring means tending to bias said valve mechanism to a position wherein said motor is energized to be held in a brake- or clutch-releasing position, and means for mechanically connecting said manually operable member to said operating element, said means being constructed and arranged to move said manually operable member to a second normal position from which it has a greater range of movement.

33. An operating mechanism for a motor vehicle clutch or brake having an operating element, comprising a motor having mechanical connection with the operating element, a control mechanism for the motor, a manually operable member, and means operable for connecting said manually operable element to said control mechanism or for establishing mechanical connection of the manually operable element with the operating element for the direct manual operation thereof wholly independently of said motor.

34. An operating mechanism for a motor vehicle clutch or brake having an operating element, comprising a power device, a control mechanism therefor, a manually operable member connected to said control mechanism, and means for establishing mechanical connection between said manually operable member and said operating element for the full manual operation of the latter wholly independently of said power device, said means being constructed and arranged upon the establishment of such connection for providing an increased range of movement of said manually operable member.

35. An operating mechanism for the clutch or brake of a motor vehicle wherein the clutch or brake has an operating element and wherein the vehicle is provided with a floor board, comprising a differential fluid pressure operated motor for actuating said operating element, a treadle mounted above the vehicle floor board and having a given normal position, a follow-up control valve mechanism having connection with said motor and with said treadle whereby said motor moves said operating element proportional to the movement of said treadle, and mechanism operative by said treadle and constructed and arranged to be connected to transmit movement of said treadle to said valve mechanism, or to said operating element wholly independently of said motor.

36. An operating mechanism for a clutch or brake having an operating element, comprising a power device, a control device therefor, a power lever connected to said power device, a control lever connected to said control device, connecting means for transmitting movement from said power lever to said operating element, a manually operable member, and mechanism operable by said manually operable member and constructed and arranged to be operated to transmit movement from said manually operable member to said control lever, or to said connecting means wholly independently of said power device.

37. An operating mechanism for a motor vehicle clutch or brake having an operating element, comprising a power device, a control device therefor, a power lever connected to said power device, a control lever connected to said control device, connecting means for transmitting movement from said power lever to said operating element, a manually operable member connected to said control lever and normally occupying an inoperative position from which it has relatively limited movement for operating said control lever, and means for connecting said manually operable member to said connecting means for the manual operation of said operating element, said last named means being constructed and arranged to move said manually operable member to a second inoperative position from which it has a greater range of movement for the manual operation of said operating element.

38. An operating mechanism for a motor vehicle clutch or brake having an operating element, comprising a power device, a control device for said power device, a manually operable member normally connected to said control device and normally mechanically disconnected from said operating element, reaction means for transmitting to said manually operable member a force reaction proportional to the force generated in said power device, and means for mechanically connecting said manually operable member to said operating element for the full manual operation thereof, said last named means being constructed and arranged for disconnecting said manually operable member from said control device and for actuating said operating element wholly independently of said power device.

JEANNOT G. INGRES.